United States Patent [19]
Pierson

[11] Patent Number: 5,368,732
[45] Date of Patent: Nov. 29, 1994

[54] HORIZONTAL BELT FILTER

[75] Inventor: Henri G. W. Pierson, Tenerife, Spain

[73] Assignee: D & C Limited, Monrovia, Liberia

[21] Appl. No.: 43,732

[22] Filed: Apr. 7, 1993

[30] Foreign Application Priority Data

Apr. 7, 1992 [GB] United Kingdom ............... 9207529

[51] Int. Cl.$^5$ ............................................ B01D 33/048
[52] U.S. Cl. .................................. 210/386; 210/400;
210/401; 210/406; 100/118; 100/211
[58] Field of Search ................ 210/400, 401, 406, 386;
100/118, 211

[56] References Cited

U.S. PATENT DOCUMENTS

| 3,459,122 | 8/1969 | Pastoors et al. | 210/400 |
|---|---|---|---|
| 4,377,479 | 3/1983 | Pierson | 210/400 |
| 4,446,023 | 5/1984 | Pierson | 210/400 |
| 4,495,070 | 1/1985 | Pierson | 210/400 |
| 5,019,258 | 5/1991 | Pierson | 210/400 |

FOREIGN PATENT DOCUMENTS 2030465 4/1980 United Kingdom .

Primary Examiner—Peter A. Hruskoci
Assistant Examiner—Robert James Popovics
Attorney, Agent, or Firm—Dennison, Meserole, Pollack & Scheiner

[57] ABSTRACT

In order to wash the lower run of a horizontal belt filter more effectively, and simultaneously provide for tensioning of the lower run, as required when progressing the belt intermittently, a dead weight roller is supported in a bight of the lower run of the filter belt and reciprocates up and down in a wash liquor vessel as a drive roller is alternately extended, so as to advance the upper run of the belt, and retracted. A one way device is located upstream of the dead weight roller to prevent backward movement of lower run. As the bight decreases and increases, rolling action of the dead weight roller rubs the belt and forces wash liquor therethrough. A plurality of dead weight rollers in one or more wash liquor vessels may be provided and they may be guided at their ends in vertical or oblique guide tracks.

9 Claims, 2 Drawing Sheets

HORIZONTAL BELT FILTER

TECHNICAL FIELD

This invention concerns a horizontal belt filter, which may be defined as filter apparatus comprising of endless filter belt (sometimes referred to as a cloth) guided to provide a substantially horizontal upper run, and a lower return run. In operation, the belt is progressed either continuously or intermittently, the upper run moving from an upstream end, where slurry to be filtered is fed onto the belt, to a downstream end where filter cake is discharged. Filtration through the belt in its upper run may be gravity or vacuum assisted.

While such filter apparatus is in operation it is necessary to provide for continuous cleaning of the filter belt after discharge of filter cake, i.e. in the lower run of the belt. The purpose of cleaning is two fold. Firstly, it is necessary to remove from the surface of the belt any adherent particulate matter which would otherwise build up on rollers or other elements around which the belt is guided and interfere with belt progression. Secondly, it is necessary to remove any matter lodged in the fabric of the belt which would otherwise reduce the porosity of the belt and impair the efficiency of filtration.

BACKGROUND ART

The traditional method of cleaning the belt is to spray wash liquor at high or medium pressure on to one or both surfaces of the belt in the lower run and collect the wash liquor in a receptacle. However, certain substances cannot readily be dislodged with a high pressure spray and require a certain residence time in a suitable solvent. In such cases, the filter belt is passed through a vessel containing a suitable solvent so as to soak the belt for a short period. Guidance of the belt through the vessel is achieved by providing additional fixed guide rollers to deflect the belt down into the liquor and subsequently up again to emerge therefrom.

Apart from the cumbersome nature of such an arrangement, it has certain serious disadvantages. The additional guide rollers impose extra frictional drag on the belt, thus reducing its life. Many of the solvents used are either corrosive (e.g. acid) or degreasing (e.g. hydrocarbon solvents) in nature. In either case the choice of suitable bearings for guide rollers which have to be immersed therein are very limited and tend to result in extra friction being applied to the belt. If the alternative course of locating guide roller bearings outside the soaking vessel is adopted it is necessary to have each roller fitted with stuffing boxes or mechanical seals. This means that the soaking vessel has to be manufactured with great precision to provide appropriate mounting surfaces for such seals and bearings.

In any event, it has been found that a simple soaking operation is usually inadequate to remove small crystals which have lodged or grown in the fabric of the cloth particularly since the residence time of any portion of the belt in the solvent is necessarily limited to less than a minute during each circuit of the belt.

OBJECT OF THE INVENTION

The object of the present invention is to provide a structurally simple manner of cleaning the filter belt more effectively in apparatus of the above mentioned type.

FURTHER BACKGROUND ART

In prior specification GB 2030465 of the same inventor, a horizontal belt filter is disclosed in which the belt is progressed by alternate incremental motion of the upper run and the lower run. A horizontally reciprocal drive roller at the downstream end of the upper run serves to advance the upper run, while a one-way device acting on the lower run prevents the lower run moving backwards. A tensioning roller supported in a bight of the lower run located between the one-way device and the upstream end of the upper run reciprocates up and down, respectively, as the drive roller moves forwards and backwards. Effectively, the tensioning rollers acts as a second drive means for the belt as the weight of this roller serves to draw the lower run through the one-way device and take up slack each time the main drive roller retracts.

Washing of the belt by pressurised sprays or passage through a soaking vessel, as mentioned above, will conventionally have been applied to such an arrangement, in the lower run, adjacent to the downstream end of the upper run.

In order to improve the efficiency of washing of the belt (which in turn improves the efficiency of filtration and extends the useful life of the belt) some form of mechanical action is necessary as well as residence time in a suitable wash liquor or solvent.

SUMMARY OF THE INVENTION

According to the present invention, this is achieved in the case of an intermittently moveable horizontal belt filter by having a dead weight roller, serving to take up slack in the lower run, reciprocate up and down in a bight of the belt within a wash liquor vessel.

The present invention provides a horizontal belt filter comprising an endless filter belt guided to provide a substantially horizontal upper run and lower return run, progressing means operative to progress the filter belt by alternate incremental motion of the upper run and the lower run, the upper run moving from an upstream end to a downstream end thereof, said progressing means comprising a reciprocable guide element at the downstream end of the upper run, and a one-way device and tensioning means, both operative on the lower run of the belt, feed means for feeding slurry to be filtered onto the upper run, and a wash liquor vessel and guide means guiding a portion of the lower run of the belt through the wash liquor vessel so as to wash the belt following discharge of filter cake at the downstream end of the upper run, characterised in that said guide means comprises a dead weight roller which is reciprocable up and down within said wash liquor vessel in a bight of the belt disposed between the one-way device and the upstream end of the upper run, and which serves as tensioning means for tensioning the lower run of the belt.

The dead weight roller guides the belt through the wash liquor without the problems of increased friction and sealing of bearings associated with additional fixed guide rollers. At the same time, the rolling of the dead weight roller as the bight is reduced and extended has the effect of rubbing the belt and forcing liquor therethrough so that material lodged therein tends to be dislodged or dissolved. This improvement in washing of the belt is achieved without use of any additional wash liquor. Additionally, the necessary tensioning, slack take up and pull through of the lower run, upon retraction of the reciprocal guide element at the downstream end of the upper run may be achieved by the dead weight roller without the need for any additional means. In some cases, however, e.g. when the filter belt is very wide or very long, therefore heavy, additional tensioning or drive means operative on the lower run may be provided.

BRIEF DESCRIPTION OF THE DRAWINGS

The invention is illustrated by accompanying drawings of exemplary embodiments and additional features and advantages of the invention will be referred to during the description thereof.

In the drawings.

DETAILS DESCRIPTION OF EXEMPLARY AND ILLUSTRATED EMBODIMENTS

Figure 1:
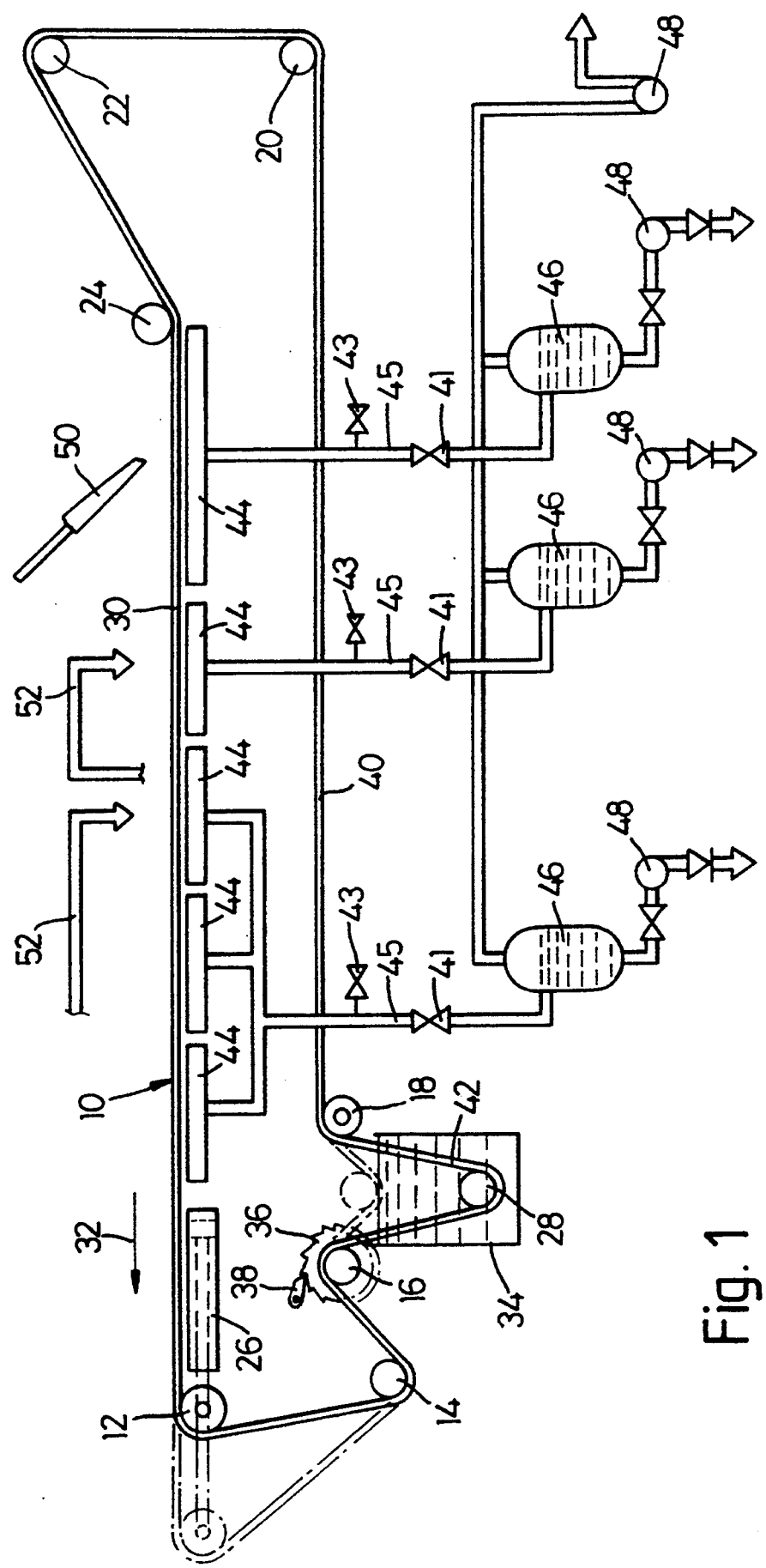
FIG. 1 is schematic side elevation of apparatus conforming to the invention.

As shown in FIG. 1, a practical embodiment of filter apparatus in accordance with the present invention comprises an endless filter belt (10) which is entrained around guide rollers (12 to 24) to provide a substantially horizontal upper run (30) extending between upstream and downstream guide rollers (24, 12) and a lower return run (40). The guide roller (12) at the downstream end of the upper run is a main drive roller which is extensible by a pneumatic ram (26) to the position shown in broken lines to advance the upper run (80) in the direction indicated by the arrow (82). In the lower run (40) the guide roller (16) has a one-way mechanism in the form of a rachet (36) mounted at one end thereof and an associated pawl (38). By cooperating with the rachet (36), the pawl permits movement of roller (16) and hence the lower run (40) of the belt (10) only in a direction from left to right as shown in FIG. 1. Thus, extension of the ram (26) and forward movement of the drive roller (12) advances the upper run (30) without any belt material moving backwards from the lower run.

A dead weight roller (28) is shown supported within a bight (42) of the lower run (40) between the guide roller (16) with the one-way mechanism (36, 38) and the subsequent guide roller (18). Supported in this manner, the roller (28) moves up and down within a tank (34) of wash liquor between the broken line and the full line positions illustrated in FIG. 1. The broken line position occurs when the drive roller (12) is in its forward position (also shown in broken lines) as the roller (12) has advanced the upper run by drawing belt material around the rollers (18, 20, 22 and 24) into the upper run. The pneumatic ram (26) is intermittently projected. When it is switched off, the drive roller (12) moves back to its full line position as the weight of the dead weight roller (28) draws belt material around rollers (14 and 16) and takes up the slack by extending the bight (42) and moving down to its full line position.

A plurality of vacuum trays (44) are arranged below the upper run (30) and are connected via fluid lines (45) to liquid receivers (46), which are further connected to pumps (48). Feed means (50) is provided for feeding slurry onto the upper surface of the upper run (30) and means (52) are indicated for spraying wash liquor onto the upper run (30) for washing filter cake formed thereon.

In operation, the upper run (30) is alternately advanced by projection of the drive roller (12) and then stationary. Slurry to be filtered is supplied by feed means (50) and wash liquor is supplied by means (52) each time the belt is advanced. During alternate stationary phases vacuum is applied to the lower surface of the upper run (30) via the vacuum trays (44) to draw liquid therethrough into the receivers (46). Actuation of the pneumatic ram (26) to advance the upper run (30) is synchronised with actuation of valve mechanisms (41, 43) so that fluid lines (45) are vented (connected to atmosphere via valves (43)) and vacuum pressure on the belt is released each time the upper run advances.

Slurry fed onto the upper run (30) is dewatered as it passes over the vacuum trays (44) and resultant filter cake is discharged at or just after the downstream roller (12) by falling therefrom or with the assistance of a doctor blade (not shown).

Each time the main drive roller (12) is pushed forward by the ram (26) the dead weight roller (28) is pulled sharply upwards within the wash liquor tank (34). As the bight (42) is shortened the roller (28) is caused to rotate quite vigorously as its rises through the wash liquor and it thereby exerts a strong rubbing action on the belt surface and also forces wash liquor through the belt. This action is similar to that encountered in a laundering process. Any fine particles of filter cake still adhering to and trapped within the fabric of the belt will tend to be dislodged and/or dissolved in the surrounding liquor. When the drive roller (12) moves back, the roller (28) tends to drop more gently as it extends the bight (42), but again a rolling action and hence a rubbing of the belt takes place. This rubbing action make the belt material pliable and opens it up for soaking prior to the more vigorous rubbing and forcing of wash liquor therethrough upon the subsequent upward movement of the roller (28) when the bight (42) is shortened during the next advance of the upper run (30).

Figure 2:
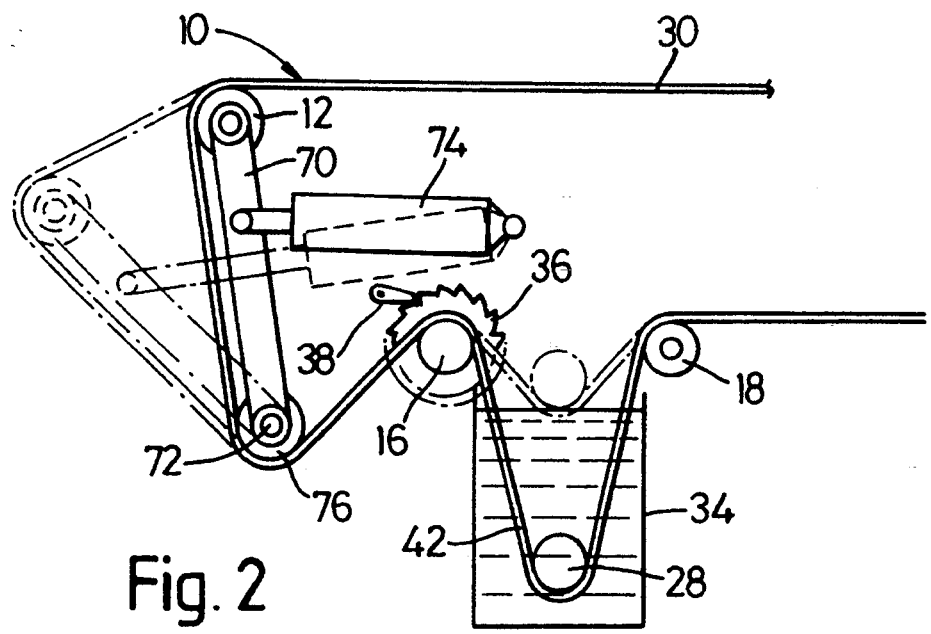
FIG. 2 is an enlarged schematic view illustrating alternative belt drive means at the downstream end of the upper run.

FIG. 2 shows an alternative manner of moving the drive roller to and fro to advance the upper run. In this case, the drive roller is mounted on a pair of arms (70) which are pivoted at (72) on the axis of guide roller (76). These arms (70) are swung forwards and backwards by a pivotally mounted pneumatic ram (74). For the other parts, which correspond to those in the first embodiment, the same reference numerals as in FIG. 1 have been used.

The dead weight roller (28) will typically consist of a hollow tube which may have a covering of impermeable material, such as plastics or rubber. Alternatively, it may be made out of steel. The surface of the roller, or any covering thereto, may be profiled by having plurality of recesses and/or projections formed therein. This may advantageously assist in the rubbing action of the roller (28) on the belt (10) as it move upwards and downwards in the bight (42).

Although not shown in FIGS. 1 and 2, the dead weight roller (28) may have its ends guided by secondary guide means provided in the wash liquor vessel. Such guide means will typically define guide tracks in which ends of the dead weight roller, or stubs or shafts provided at the ends of the roller are guided. With ample clearance between the dead weight roller (28), or its stubs or shafts, and the track, friction can be minimised.

Figure 3:
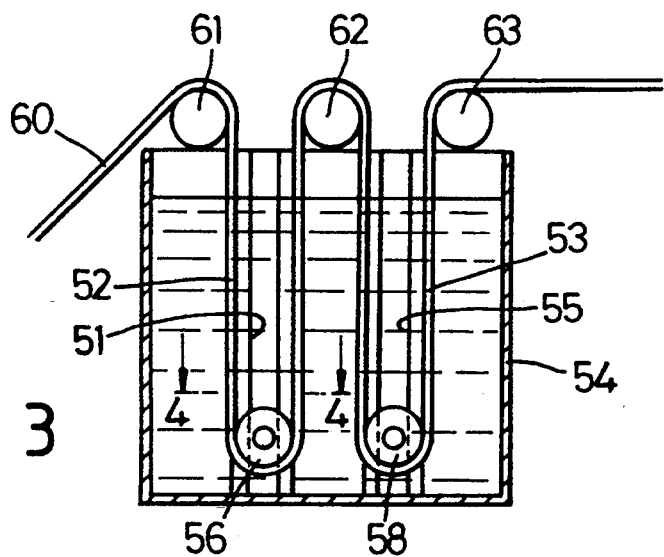
FIG. 3 is an enlarged schematic view illustrating a wash liquor vessel of another embodiment having two dead weight rollers.
Figure 4:
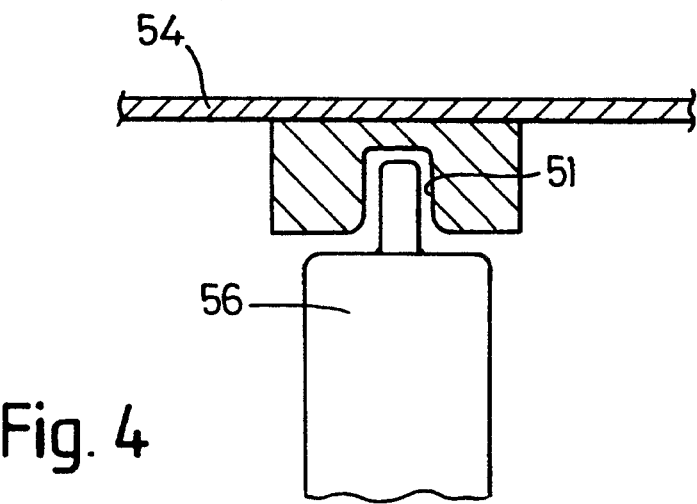
FIG. 4 is an enlarged partial sectional view along line 4—4 of FIG. 3 showing guide means for one of the dead weight rollers.

FIG. 3 shows a modified arrangement in which two dead weight rollers (56, 58) are supported in successive bights (52, 53) in the lower run of a filter belt (60), between respective pairs of conventional guide rollers (61, 62) and (62, 63). Both bights suspend their respective dead weight rollers (56, 58) in a common vessel (54) of wash liquor. Use of two or more dead weight rollers in respective bights of the lower run of the belt allows for take up of additional slack and has the additional advantage of prolonging the residence time of the belt in the wash liquor while minimising necessary dimensions of the vessel and minimising the volume of wash liquor used. In other embodiments respective dead weight rollers may be disposed in separate wash liquor vessels. In the illustrated example, the dead weight rollers (56, 58) are shown having stubs guided in respective vertical guide tracks (51, 55).

In other embodiments, where guide tracks or other guide means are provided for the dead weight rollers, these need not be arranged vertically. Obliquely extending guide tracks may have certain advantages, e.g. in enhancing the rubbing action of the dead weight rollers on the filter belt.

The invention is not limited to precise details illustrated or mentioned in respect of the foregoing embodiment. In particular, the one-way device need not comprise a rachet and pawl mechanism and can, for example, comprise a friction device. Alternative methods of reciprocating the drive roller may be employed. Also, the drive means need not comprise a roller. A fixed bar may function equally well. Further, it may be possible to add weight to the dead weight roller to improve its function in take up of slack in the lower run of the belt. In this respect, if the roller is hollow, additional weights could be inserted in its interior.

The invention does not preclude the use of additional tensioning means or additional drive means operating on the lower run of the belt where circumstances so require.

I claim:

1. In a horizontal belt filter comprising:
   an endless filter belt guided to provide a substantially horizontal upper run and a lower return run;
   progressing means operative to progress the belt by alternate incremental motion of the upper run and the lower run, the upper run moving from an upstream end to a downstream end thereof, said progressing means comprising a reciprocable guide element at the downstream end of the upper run and a one-way device and tensioning means, both operative on the lower run of the belt;
   feed means for feeding slurry to be filtered onto the upper run; and
   a wash liquor vessel and guide means guiding a portion of the lower run of the belt through the wash liquor vessel so as to wash the belt following discharge of filter cake at the downstream end of the upper run;
   the improvement wherein said guide means comprises a dead weight roller which is reciprocable up and down within said wash liquor vessel in a bight of the belt disposed between the one-way device and the upstream end of the upper run, and which serves as tensioning means for tensioning the lower run of the belt, and as a cleaning means rubbing against the belt.

2. A filter as set forth in claim 1 wherein secondary guide means provided in said wash liquor vessel serve to guide the ends of said reciprocable dead weight roller.

3. A filter as set forth in claim 2 wherein said secondary guide means in said wash liquor vessel define guide tracks in which ends of said dead weight roller are located.

4. A filter as set forth in claim 3 wherein said guide tracks are substantially vertical.

5. A filter as set forth in claim 2 wherein said dead weight roller is provided, at each end, with reduced diameter stubs or shafts which engage said secondary guide means.

6. A filter as set forth in claim 1 wherein said dead weight roller comprises a hollow tube.

7. A filter as set forth in claim 1 wherein said dead weight roller is provided with a covering impermeable material.

8. A filter as set forth in claim 1 wherein said dead weight roller has recesses and/or projections formed on its surface.

9. A filter as set forth in claim 1 and having a plurality of dead weight rollers reciprocable in successive bights of said belt within said wash liquor vessel.

* * * * *